US011385905B2

(12) United States Patent
Aghaiepour et al.

(10) Patent No.: US 11,385,905 B2
(45) Date of Patent: Jul. 12, 2022

(54) MANAGING BOOT DEVICE ORDERS FOR COMPUTING DEVICES

(71) Applicant: Red Hat, Inc., Raleigh, NC (US)

(72) Inventors: Kambiz Aghaiepour, Carrboro, NC (US); Gonzalo Antonio Rafuls, Brno (CZ); William W. Foster, Jr., Dublin (IE)

(73) Assignee: Red Hat, Inc., Raleigh, NC (US)

( * ) Notice: Subject to any disclaimer, the term of this patent is extended or adjusted under 35 U.S.C. 154(b) by 168 days.

(21) Appl. No.: 16/898,139

(22) Filed: Jun. 10, 2020

(65) Prior Publication Data

US 2021/0389957 A1    Dec. 16, 2021

(51) Int. Cl.
| | | |
|---|---|---|
| *G06F 9/44* | (2018.01) | |
| *G06F 9/4401* | (2018.01) | |
| *G06F 11/07* | (2006.01) | |
| *G06F 11/14* | (2006.01) | |
| *G06F 9/445* | (2018.01) | |

(52) U.S. Cl.
CPC ............ *G06F 9/4416* (2013.01); *G06F 9/441* (2013.01); *G06F 9/44505* (2013.01); *G06F 11/0772* (2013.01); *G06F 11/1417* (2013.01)

(58) Field of Classification Search
CPC .................................... G06F 1/32; G06F 9/44
See application file for complete search history.

(56) References Cited

U.S. PATENT DOCUMENTS

| | | | |
|---|---|---|---|
| 7,222,147 B1 | 5/2007 | Black et al. | |
| 7,756,954 B2 | 7/2010 | Schmidt et al. | |
| 8,522,005 B2 | 8/2013 | Mahmoud et al. | |
| 8,819,650 B2 | 8/2014 | Barcia et al. | |
| 9,148,465 B2 | 9/2015 | Gambardella et al. | |
| 9,495,371 B2 | 11/2016 | Fortune et al. | |
| 11,212,286 B2 * | 12/2021 | Schmitt ................. | G06F 3/0604 |
| 2007/0245142 A1 * | 10/2007 | Rios ...................... | G06F 21/572 |
| | | | 713/168 |
| 2009/0113195 A1 * | 4/2009 | Mohrmann ........... | G06F 9/4408 |
| | | | 713/2 |
| 2009/0113198 A1 * | 4/2009 | Liu ...................... | H04L 41/0803 |
| | | | 713/2 |

FOREIGN PATENT DOCUMENTS

WO        2010114855 A1    10/2010

OTHER PUBLICATIONS

Spear, Michael F.; Roeder, Tom; Hodson, Orion; Hunt, Galen C.; Levi, Steven. "Solving the Starting Problem: Device Drivers as Self-Describing Artifacts." Dept. of Computer Science University of Rochester; Dept. of Computer Science, Cornell University; Apr. 18-21, 2006. http://citeseerx.ist.psu.edu/viewdoc/download?doi=10.1.1.120.1382&rep=rep1&type=pdf.

* cited by examiner

*Primary Examiner* — Keshab R Pandey
(74) *Attorney, Agent, or Firm* — Womble Bond Dickinson (US) LLP

(57) ABSTRACT

Systems and methods for managing boot device orders for computing devices are disclosed. A device management module may use boot metadata to provide a common syntax/format for a user to indicate a boot order for the computing device. The device management module may determine the appropriate commands for a particular type of computing device and use the appropriate commands to set the boot order of the computing devices to the desired boot order.

18 Claims, 6 Drawing Sheets

MANAGING BOOT DEVICE ORDERS FOR COMPUTING DEVICES

TECHNICAL FIELD

Aspects of the present disclosure relate to bootable devices for computing devices, and more particularly, to managing boot orders for bootable devices of computing devices.

BACKGROUND

A computing device may include various components (e.g., hardware) such as processing devices, memory, and other hardware devices (e.g., sound card, video card, network interface card, etc.). Some of these components/hardware may be bootable devices. A bootable device may be a device, component, module, circuit, etc., from which an operating system for the computing device may be loaded and/or accessed. A computing device may access the bootable devices according to a boot order. For example, the boot order may include a list of bootable devices. The computing device may attempt to load an operating from each bootable device in the list, starting from the first bootable device in the list.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
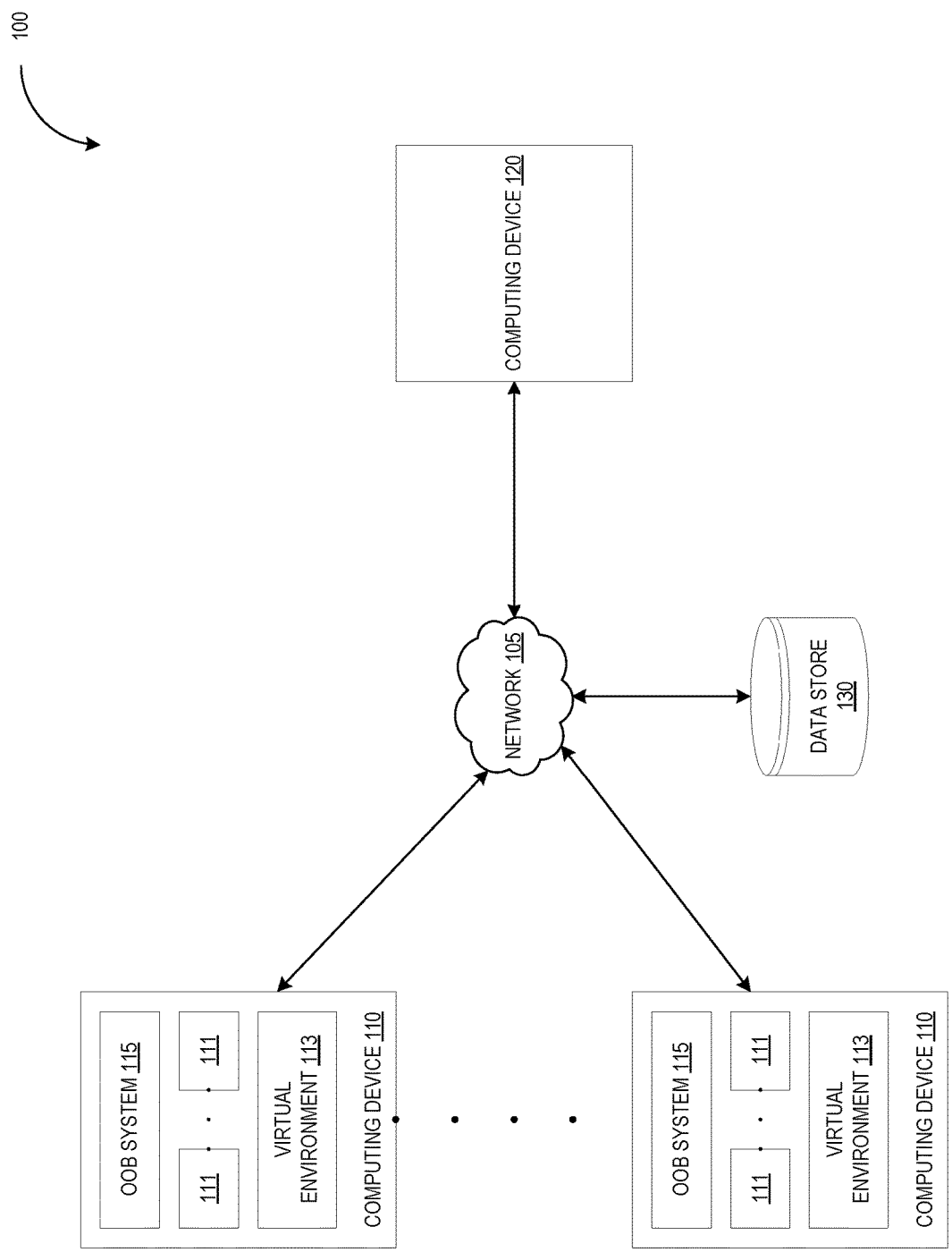
FIG. 1 is a block diagram that illustrates an example system architecture, in accordance with some embodiments of the present disclosure.

As discussed above, a computing device may include a set of bootable devices. A bootable device may be a device, component, module, circuit, etc., from which an operating system for the computing device may be loaded and/or accessed. The computing device may access the bootable devices according to a boot order. For example, the computing device may access the bootable devices as indicated in the boot order until the computing device is able to load an operating system from a bootable device. The computing device may also include an out-of-band (OOB) system. The OOB system may allow a user to access the computing device and/or manage the settings/configuration of the computing device. For example, the OOB system may allow a user to change the boot order of the computing device.

Multiple types of computing devices may be used in a system architecture. For example, computing devices of different makes/models (e.g., from different vendors) may be used within the system architecture. The heterogeneous computing devices may provide storage and/or computing resources for users of the system architecture (e.g., may host virtual machines or containers). Each of the different types of computing devices may have a different OOB system. For example, a first computing device from a first vendor may have an OOB system that uses commands in a first format and a second computing device from a second vendor may have an OOB system that uses commands in a second format. In addition, different vendors may use different methods for accessing an OOB system. For example, a first vendor may use an internet protocol (IP) address while a second vendor may use a uniform resource locator (URL). In order for a user to manage the boot orders of the various computing devices, the user may need to remember all of the different commands/instructions for different makes and/or models of computing devices. The user may also need to remember how to access each of the different OOB systems. Thus, managing the boot orders (and other parameters/settings) of the computing devices may be more difficult, time consuming, problematic, etc., process/task.

The embodiments, examples, implementations, etc., disclosed herein provide a device management module that uses boot metadata to provide a common syntax/format for a user to indicate a boot order for the computing device. The user may indicate a boot order for different computing devices using the common syntax in the boot metadata. By using the common syntax, the user may indicate a desired boot order using the same syntax (e.g., the common syntax/format) regardless of the types (e.g., the make/model) of the different computing devices. This allows the user to specify a desired boot order for a computing device more quickly, efficiently, easily, etc. The device management module may determine the appropriate commands for a particular type of computing device and use the appropriate commands to set the boot order of the computing devices to the desired boot order. For example, the device management module may use the boot order specified using the common syntax (e.g., specified in the boot metadata) and may look up the appropriate set of commands for the specific type of the computing device. This reduces the amount of time and effort for the user to determine the appropriate commands for setting the boot order for a specific type of computing device. For example, a user may not need to remember different types of commands/instructions, different command parameters, etc., for different types of computing devices (e.g., different makes/models of computing devices). Thus, the device management module and/or the boot metadata (with the common syntax/format) disclosed herein may allow the user to more easily, quickly, and/or efficiently set the boot order of a computing device.

FIG. 1 is a block diagram that illustrates an example system architecture 100. The system architecture 100 includes a network 105, computing devices 110, computing device 120, and a data store 130. The data store 130, computing devices 110, and computing device 120 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g. cell towers), etc. In some embodiments, the network 105 may be an L3 network. The network 105 may carry communications (e.g., data, message, packets, frames, etc.) between data store 130, computing devices 110, and computing device 120.

Each computing device (e.g., each computing device 110, computing device 120, etc.) may include hardware such as processing devices (e.g., processors, central processing units (CPUs), programmable logic devices (PLDs), etc.), memory (e.g., random access memory (e.g., RAM), storage devices (e.g., hard-disk drive (HDD), solid-state drive (SSD), etc.), and other hardware devices (e.g., sound card, video card, etc.). In some embodiments, data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory may be configured for long-term storage of data and may retain data between power on/off cycles of the computing device. Each computing device may comprise any suitable type of computing device or machine that has a programmable processor including, for example, server computers, desktop computers, laptop computers, tablet computers, smartphones, set-top boxes, etc. In some examples, each of the computing devices 110 and 120 may comprise a single machine or may include multiple interconnected machines (e.g., multiple servers configured in a cluster).

Each computing device 110 includes a set of bootable devices 111 (e.g., one or more bootable devices 111). In one embodiment, a bootable device 111 may be a device, component, module, circuit, etc., from which an operating system for the computing device 110 may be loaded. For example, the operating system may be stored on and/or accessible via the bootable device 111. Examples of bootable devices may include, but are not limited to, a storage device (e.g., a hard disk, a solid state disk (SSD), a hard disk drive (HDD)), a flash memory, an optical disc drive (e.g., a digital video disc (DVD) drive, a Blu-Ray disc drive), a memory card, a network interface card (e.g., a NIC, a wireless card, etc.), a universal serial bus (USB) device (e.g., a USB mass storage device, a USB memory stick, another device coupled to the computing device via a USB port, etc.). A bootable device 111 may also be referred to as a boot device.

The operating system may manage the execution and/or operation of other components (e.g., software, applications, etc.) of the computing device 110. The operating system may also manage access to and/or manage the operation of the hardware (e.g., processors, memory, storage devices etc.) of the computing device 110. The operating system may also be referred to as a host operating system. Different operating systems for a computing device 110 may be stored on different bootable devices 111 for the computing device 110. Different operating systems for a computing device 110 may also be stored on a single bootable device 111 (e.g., may be stored in different partitions of the bootable device 111).

Each computing device 110 also includes a virtual environment 113. In one embodiment, a virtual environment 113 may be a virtual machine (VM) that may execute on a hypervisor which executes on top of the operating system for a computing device 110. The hypervisor may manage system sources (including access to hardware devices, such as processors, memories, storage devices). The hypervisor may also emulate the hardware (or other physical resources) which may be used by the VMs to execute software/applications, as discussed in more detail below. In another embodiment, a virtual environment 113 may be a container that may execute on a container engine which executes on top of the operating system for a computing device 110, as discussed in more detail below. The container engine may allow different containers to share the operating system of a computing device 110 (e.g., the operating system kernel, binaries, libraries, etc.). The container engine may also perform other functions, such as creating containers deleting/removing containers, etc.

Each computing device 110 further includes an out-of-band (OOB) system 115. The OOB system may include hardware (e.g., a separate processing device, a separate network interface, separate memory, etc.), software, firmware, or a combination thereof. The OOB system 115 may be coupled to the network 105 and/or may be accessible via a separate network (not illustrated in FIG. 1). The separate network may allow the OOB system 115 to remain accessible even when there are problems with the network 105. The OOB system 115 may have access or permission to change various settings, parameters, configurations, etc., of the computing device 110. For example, the OOB system 115 may be able to modify the basic input/output system (BIOS) or a unified extensible firmware interface (UEFI). The OOB system 115 may allow a user to access, manage, and/or configure the computing device 110 regardless of the current state of the computing device 110.

In one embodiment, the computing devices 110 may be heterogeneous computing devices 110 (e.g., may be a set of heterogeneous computing devices). The computing devices 110 and 120 may be implemented, manufactured, distributed, sold, etc., by a common entity/organization or by different entities/organizations (e.g., different vendors). For example, a first computing device 110 may be manufactured/sold by a first vendor and a second computing device 110 may be sold by a second vendor. In another example, a first computing device 110 may be a first model sold/manufactured by a vendor and a second computing device 110 may be a second model sold/manufactured by the same vendor.

As discussed above, an OOB system 115 may be used to configure and/or manage a computing device 110. For example, a user (e.g., a system administrator, a network administrator, an engineer, etc.) may use the computing device 120 to access the OOB system 115 (e.g., to log into the OOB system 115, to communicate with the OOB system 115, etc.) to configure the computing device 110. The computing devices 120 may be a terminal, workstation, etc., that allows the user to access the OOB systems 115 of the computing devices 110. One type of setting that the user may be able to configure may be a boot order for the computing device 110. In one embodiment, the boot order may indicate an order for the bootable devices 111 that should be used when the computing device 110 boots or starts up. For example, the boot order may indicate a list (an order, a sequence, etc.) of three bootable devices 111. The computing device 110 may use a first bootable device 111 on the list to load or access an operating system. If an operating system cannot be loaded or accessed from the first bootable device 111, the computing device 110 may proceed to the second bootable device 111 on the list. If an operating system cannot be loaded or accessed from the second bootable device 111, the computing device 110 may proceed to the third bootable device 111 on the list. The boot order for a computing device 110 may be stored in the BIOS, the UEFI, etc., of the computing device 110. The boot order for a computing device 110 may also be referred to as a boot sequence.

In some embodiments, the boot order of a computing device 110 may be smaller than the number of bootable devices 111 in the computing device 110. For example, a computing device 110 may include five different bootable devices 111. A boot order may include fewer than five bootable devices 111. For example, the boot order may indicate four of the five different bootable devices 111 in a particular order. Thus a boot order may include any subset of the bootable devices 111 on the computing device 110, including all of the bootable devices 111 on the computing device 110.

Also as discussed above, the computing devices 110 may be a set of heterogeneous computing devices. For example, the computing devices 110 may be manufactured/sold by different vendors and/or may be different models sold by a same vendor. Because the computing devices 110 may be heterogeneous, the commands, messages, data formats, etc., that are used by the OOB system 115 may vary between different computing devices 110. For example, the messages/instructions for changing the boot order for a first computing device manufactured by a first vendor may be different from the messages/instructions for changing the boot order for a second computing device manufactured by a second vendor. In addition, the methods of accessing the different OOB systems 115 may also vary between different computing devices 110 (e.g., between the heterogeneous computing devices). For example, a first OOB system 115 may be accessible via a first network port and a second OOB system 115 may be accessible via a second network port. The differences and variations in the messages/instructions for changing the boot order of the computing devices 110 (and for performing other types of management operations) may cause various difficulties, inconveniences, issues, etc., for a user. For example, it may be difficult for a user to remember the different messages/instructions (e.g., different syntaxes, different parameters, etc.) for the different OOB systems 115 of different makes and/or models of computing devices 110. In another example, it may be difficult for a user to remember different internet protocol (IP) addresses, different ports, different uniform resource locators (URLs), etc., for the different OOB systems 115 of different makes and/or models of computing devices 110.

Figure 2:
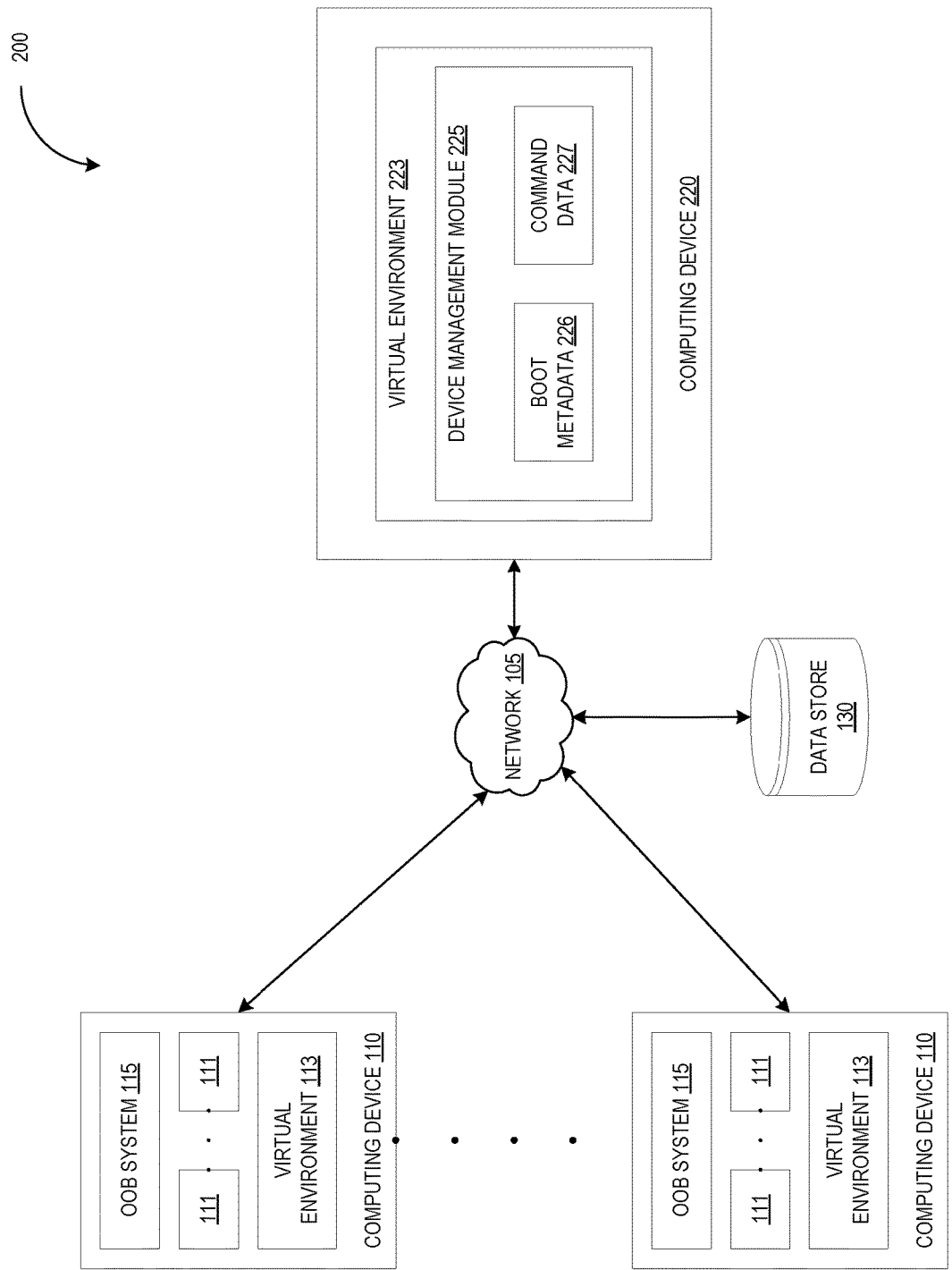
FIG. 2 is a block diagram that illustrates an example system architecture, in accordance with some embodiments of the present disclosure.

FIG. 2 is a block diagram that illustrates an example system architecture 200. The system architecture 200 includes a network 105, computing devices 110, computing device 220, and a data store 130. The data store 130, computing devices 110, and computing device 220 may be coupled to each other (e.g., may be operatively coupled, communicatively coupled, may communicate data/messages with each other) via network 105 (e.g., a public network, a private network, a wide area network (WAN), a wireless network, or a combination thereof). The network 105 may carry communications (e.g., data, message, packets, frames, etc.) between data store 130, computing devices 110, and computing device 220. Each computing device (e.g., each computing device 110, computing device 220, etc.) may include hardware (e.g., processing devices, memory, storage devices, etc.). In some examples, each of the computing devices 110 and 220 may comprise a single machine or may include multiple interconnected machines (e.g., multiple servers configured in a cluster).

Each computing device 110 includes a set of bootable devices 111. In one embodiment, a bootable device 111 may be a device, component, module, circuit, etc., from which an operating system for the computing device 110 may be loaded. The computing device 110 may access the bootable devices 111 according to a boot order, as discussed above. The boot order may include a subset of the bootable devices 111 or all of the bootable devices 111. The operating system may manage the execution and/or operation of other components and hardware of the computing devices 110. Each computing device 110 also includes a virtual environment 113. In one embodiment, a virtual environment 113 may be a virtual machine (VM) that may execute on a hypervisor which executes on top of the operating system for a computing device 110. In another embodiment, a virtual environment 113 may be a container that may execute on a container engine which executes on top of the operating system for a computing device 110.

Each computing device 110 further includes an out-of-band (OOB) system 115. The OOB system may include hardware, software, firmware, or a combination thereof. The OOB system 115 may be coupled to the network 105 and/or may be accessible via a separate network (not illustrated in FIG. 1). The OOB system 115 may allow a user to access, manage, and/or configure the computing device 110 regardless of the current state of the computing device 110.

In one embodiment, the computing devices 110 may be heterogeneous computing devices 110. For example, the computing devices 110 may be different types, models, etc., from different manufacturers/vendors. As discussed above, an OOB system 115 may be used to configure and/or manage a computing device 110. One type of setting that the user may be able to configure may be a boot order for the computing device 110.

The computing devices 110 may be a set of heterogeneous computing devices (e.g., different makes and/or models of computing devices manufactured/sold by different vendors). Because the computing devices 110 may be heterogeneous, the commands, messages, data formats, etc., that are used by the OOB system 115 may vary between different computing devices 110. The differences and variations in the messages/instructions for changing the boot order of the computing devices 110 (and for performing other types of management operations) may cause various difficulties, inconveniences, issues, etc., for a user.

The computing device 220 includes a virtual environment 223. In one embodiment, the virtual environment 223 may be a container. The container may include a device management module 225. For example, the device management module 225 may execute within the container (e.g., the virtual environment 223). In some embodiments, the device management module 225 may execute within other types of virtual environment, such as virtual machines. In other embodiments, the device management module 225 may be an application that executes within the computing device 220. For example, the device management module 225 may execute outside of a virtual environment.

In one embodiment, the device management module 225 may receive a request to modify a boot order for a set of bootable devices 111 on a computing devices. For example, the device management module 225 may provide an interface (e.g., a command line interface (CLI), a graphical user interface (GUI), etc.) for a user of the computing device 220. A user may provide the request via the interface. The request may include an identifier for the computing device 110 and a configuration for the computing device 110. The identifier may be a name, an alphanumeric string, an address, or other data that may be used to identify a particular computing device 110. The configuration may be a name, an alphanumeric string, or other data that may be used to indicate a purpose, function, role, etc., for the computing device 110 (e.g., the "foreman" configuration may indicate that the computing device 110 manages other computing devices 110).

In one embodiment, the device management module 225 may determine a boot order for the set of bootable devices 111 based on the boot metadata 226. The boot metadata 226 may include a set of boot orders for the computing devices 110. The boot metadata may conform to and/or may use a common syntax. The syntax may be standardized across the computing devices 110 (e.g., across the set of heterogeneous computing devices). The boot metadata 226 may allow the user to provide a more general or more abstract instruction to change the boot order of a computing device 110. For example, rather than providing specific sets of instructions for different types of computing devices 110, the boot metadata 226 may change the boot order of a computing device based on the common/standardized syntax of the boot metadata 226.

In one embodiment, the boot metadata 226 may include a set of entries. Each entry in the boot metadata 226 may include a computing device type identifier, a configuration, and a boot order. The boot order may indicate a set of bootable devices, the locations for the bootable devices, and identifiers for the bootable devices. The contents of the boot metadata 226 are discussed in more detail below.

In one embodiment, the device management module 225 may determine a boot order for the set of bootable devices 111 based on one or more of the identifier for the computing device and the configuration for the computing device. For example, the device management module 225 may use the identifier (e.g., name) for a computing device 110 to determine the make and/or model of the computing device 110 (e.g., the manufacture/vendor, the model, etc.). The device management module 225 may also use make/model and the configuration (received in the request) to identify an entry in the boot metadata 226, as discussed in more detail below.

In one embodiment, the device management module 225 may determine a set of commands to set the boot order for a set of bootable devices 111 of the computing device 110, based on the command data 227. The command data 227 may be one or more libraries, application programing interfaces (APIs), or other data that may indicate commands, instructions, etc., for managing different types (e.g., different makes/models) of computing devices. The command data 227 may indicate or include the appropriate commands (e.g., instructions messages, instruction/command formats, instruction/command parameters, etc.) for all of the different makes/models of computing devices 110 that are part of the system architecture 200. For example, the command data 227 may be a collection of different sets of commands (e.g., libraries, APIs, etc.) which include commands for the types and models of computing devices 110 from various vendors/manufacturers. For example, each set of commands may be for a particular make and/or model of computing device 110. The device management module 225 may use the identifier (received in the request) to determine the make/model of the computing device 110. For example, a list of the different identifiers and the different makes and/or models of the computing devices 110 may be stored on the computing device 110 or on the data store 130. The list may be part of the boot metadata 226 or the command data 227 in other embodiments. Based on the make/model of the computing device 110, the device management module 225 may obtain the appropriate set of commands (for the make/model of the computing device 110) from the command data 227. The device management module 225 may also determine how to access an OOB system 115 based on the command data 227. For example, the command data 227 may indicate the URL, port number, IP address, etc., for accessing an OOB system 115.

In one embodiment, the device management module 225 may transmit the set of commands (for setting the boot order of the bootable devices 111 to a particular boot order) to the OOB system 115 of the computing device 110. For example, the device management module 225 may access the OOB system 115 via the network 105 or a separate network (not illustrated in FIG. 2). The device management module 225 may also receive one or more results (e.g., messages, frames, packets, etc., which indicate the results) of the set of commands. For example, the device management module 225 may receive a message indicating whether the commands were successfully performed. In another example, the device management module 225 may receive a message indicating whether there were errors that occurred when the OOB system 115 performed the one or more commands.

In one embodiment, the device management module 225 may determine whether the boot order of the computing device 110 matches the boot order requested by a user, before setting the boot order of the computing device 110 to the requested boot order. For example, a user request may indicate an identifier and a configuration for the computing device 110, as discussed above. The device management module 225 may determine the requested boot order for the computing device 110 based on the boot metadata 226, the configuration, and the identifier for the computing device 110. The device management module 225 may communicate with the OOB system 115 of the computing devices 110 to determine the current boot order of the computing device 110. For example, the device management module 225 may transmit message, commands, etc., to the OOB system 115 to request the current boot order. If the current boot order matches the requested boot order, the device management module 225 may refrain from transmitting the set of commands (e.g., may not transmit the set of commands to the OOB system 115 or computing device 110).

In one embodiment, the device management module 225 may determine that the boot order requested by a user has an error with one or more bootable devices. For example, the user may request a boot order that includes a bootable device that does not exist in the computing device 110. In another example, the user may request a boot order that includes an incorrect identifier for a bootable device. The device management module 225 may set the boot order to use the other bootable devices indicated in the boot order (e.g., the remaining bootable devices, a subset of the bootable devices indicated in the boot order, etc.). For example, if a boot order indicates three bootable devices and the second bootable device has an error (e.g., an incorrect identifier is specified, the bootable device is not located in the computing device), the device management module 225 may set the boot order to use the first bootable device 111 and the third bootable device 111, in that order. The device management module 225 may also provide an error message to the user, indicating that there is an error with one or more bootable devices 111 indicated in the boot order. For example, the device management module 225 may provide (e.g., present, display, show, etc.) an error message to the user via a GUI, a command line interface, etc.

In one embodiment, the device management module 225 may receive a request to check the boot order (e.g., the current boot order) for the set of bootable devices 111 in the computing device 110. For example, the user may provide the request via a GUI, command line interface, etc., provided by the device management module 225. The device management module 225 may request the current boot order of the computing device 110 via the OOB system 115. For example, the device management module 225 transit a message, a command, an instruction, etc., to the OOB system 115 of the computing device 110 to request the current boot order. The OOB system 115 may transmit one or more message (e.g., frames, packets, etc.) with the current boot order to the device management module 225. The device management module 225 may provide the current boot order for the set of bootable devices 111 to the user. For example, the device management module 225 may present, display, etc., the current boot order via a GUI, a command line interface, etc.

In one embodiment, the device management module 225 may receive a request to use a first bootable device 111 on a computing device 110 for a one-time boot of the computing device 110. The request may include an identifier (e.g., a name) for the computing device 110. Using the first bootable device 111 for a one-time boot may refer to using loading/accessing the operating system for the computing device 110 from the first bootable device 111 for a single boot up of the computing device 110, and then using the current boot order (the boot order indicated in the BIOS of the computing device 110) for subsequent boot ups of the computing device 110. This may allow a user to temporarily use a specific bootable device 111 without changing the boot order of the computing device 110. The device management module 225 may determine a set of commands (e.g., one or more commands, instructions, etc.) to configure the computing device 110 to use the first bootable device 111 for a one-time boot, based on the command data 227. For example, the device management module 225 may determine the make/model of the computing device 110 based on the identifier of the computing device 110. The device management module 225 may retrieve the set of commands for setting a particular bootable device 111 for a one-time boot from the command data 227. The device management module 225 may transmit the retrieved set of commands to the OOB system 115 to configure the computing device 110 to use the first bootable device 111 for a one-time boot. The device management module 225 may also receive one or more results from the OOB system 115 indicating whether the OOB system 115 was successful in configuring the computing device 110 to use the first bootable device 111 for a one-time boot.

In one embodiment, the device management module 225 may receive a request for a list of the bootable devices 111 that in the computing devices 110. For example, a user may want to get a list, catalog, inventory, record, etc., of all of the bootable devices 111 that are available on the computing devices 110. The device management module 225 may communicate with each OOB system 115 of each computing device 110 in the system architecture 200 and may request a listing of the bootable devices 111 on the respective computing device 110. The device management module 225 may receive a listing from each OOB system 115 (e.g., of each computing device 110) and may combine the listings into a final list which may include a list of computing devices 110 and the respective set of bootable devices 111 on each computing device 110. The device management module 225 may provide the final list to the user (e.g., via a GUI, via a command line interface, etc.).

Although FIG. 2 may illustrate the boot metadata 226 and the command data 227 as part of the device management module 225, one or more of the boot metadata 226 and the command data 227 may be separate from the device management module 225. For example, one or more of the boot metadata 226 and the command data 227 may be stored in the data store 130. In another example, one or more of the boot metadata 226 and the command data 227 may be stored separate from the virtual environment 223 (e.g., may be located on a different storage device of the computing device 220). In addition, although the present disclosure may refer to the boot order of a computing device, other types of parameters, settings, etc., may be configured and/or managed via the OOB system 115. In other embodiments, the device management module 225 may use other types of metadata (similar to the boot metadata 226) for sending commands to perform other diagnostic and/or management functions/operations via the OOB system 115. The other types of metadata may also provide a common syntax or format for specifying which operations/functions should be performed.

As discussed above, using heterogeneous computing devices (e.g., different makes and/or models of computing devices manufactured/sold by different vendors) may cause problems for a user when the user attempts to manage the boot orders (or other configuration parameters/settings) of the computing devices 110. Because the computing devices 110 are heterogeneous, the commands, messages, data formats, etc., that are used by the OOB system 115 may vary between different computing devices 110. If may be more difficult and more time consuming for the user to remember the differences and variations in the messages/instructions for changing the boot order of the computing devices 110. The device management module 225 uses boot metadata 226 to provide a common syntax/format for a user to indicate a boot order for the computing device. The common syntax/format may allow the user to indicate a desired boot order regardless of the type (e.g., the make/model) of the computing devices. The device management module 225 may determine the appropriate commands for a particular type of computing device 110 and use the appropriate commands to set the boot order of the computing device 110 to the desired boot order. The common syntax/format of the boot metadata 226 allows the user to more easily, quickly, and/or efficiently set the boot order of a computing device.

Figure 3:
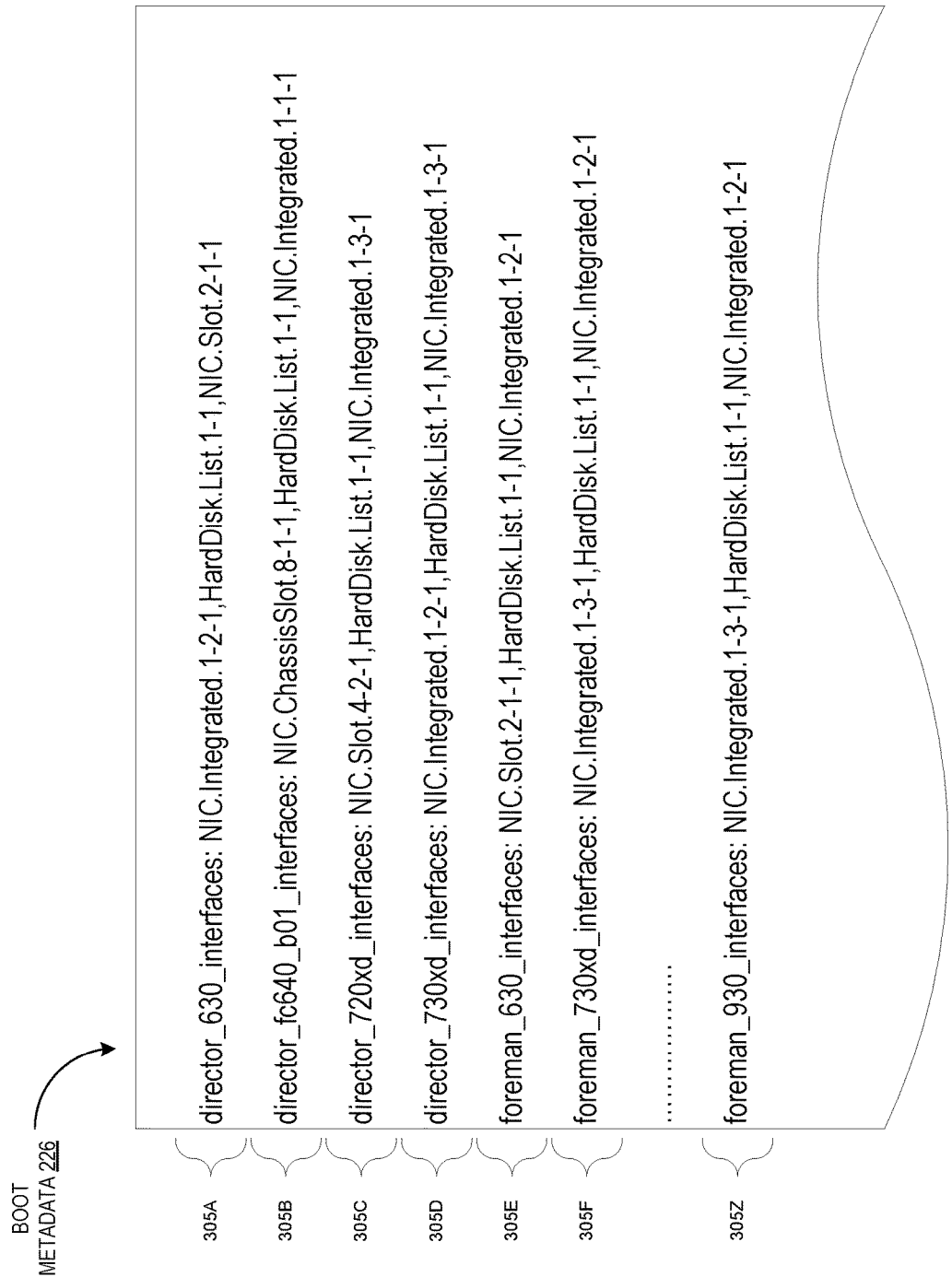
FIG. 3 is a diagram illustrating example device boot metadata, in accordance with some embodiments of the present disclosure.

FIG. 3 is a diagram illustrating example boot metadata 226, in accordance with some embodiments of the present disclosure. The boot metadata 226 includes example entries 305A through 305Z. Each entry 305A through 305Z may include a computing device type identifier, a configuration, and a boot order. The boot order may indicate a set of bootable devices, the locations for the bootable devices, and identifiers for the bootable devices. For example, entry 305B include the following text:
director_fc640_b01_interfaces: NIC.ChassisSlot.8-1-1, HardDisk.List.1-1,NIC.Integrated.1-1-1.
The text "director" may indicate a configuration for a computing device. As discussed above, the configuration may indicate the role, function, purpose of a computing device. The text "fc640_b01" may indicate a computing device type identifier. The computing device type identifier may indicate the make and/or model of the computing device. The text "NIC.ChassisSlot.8-1-1,HardDisk.List.1-1, NIC.Integrated.1-1-1" may be a comma delimited list that indicate the boot order for the configuration "director" and for the make/model "fc640_b01." Entry 305B indicates a boot order that includes three bootable devices. The first device in the boot order is represented with the text "NIC.ChassisSlot.8-1-1" where "NIC" represents the type of the boot device (e.g., a network interface card), "ChassisSlot" represents the location of the bootable device (e.g., a slot in a chassis of the computing device), and "8-1-1" is an identifier for the bootable device. The second device in the boot order is represented with the text "HardDisk.List.1-1" "HardDisk" represents the type of the boot device (e.g., a hard disk drive), "List" represents the location of the bootable device (e.g., a bus slot, such as a peripheral component interconnect express (PCIe) slot), and "1-1" is an identifier for the bootable device. The third device in the boot order is represented with the text "NIC.Integrated.1-1-1" where "NIC" represents the type of the boot device (e.g., a network interface card), "Integrated" represents the location of the bootable device (e.g., a NIC integrated into a motherboard of the computing device, such as an onboard NIC card), and "8-1-1" is an identifier for the bootable device.

As discussed above, a computing device (e.g., a device management module) may receive requests to manage the boot orders of a set of heterogeneous computing devices (e.g., computing devices of different makes/models). A request may include an identifier for a computing device and a configuration for the computing devices. The device management module may determine the make and/or model (e.g., a model number, a model name, etc.) for the computing device based on the identifier. For example, the device management module may access a list of computing devices and their corresponding makes/models. Based on the make/model and the configuration, the device management module may identify an entry in the boot metadata 226. The device management module may set the boot order for the computing device to the boot order indicated in the identified entry (e.g., one of entries 305A through 305Z).

Although FIG. 3 may illustrate example syntax for the boot metadata 226, other formats, syntaxes, etc., may be used in the boot metadata 226 in other embodiments. For example, rather than using a comma delimited list for the boot order, the boot order may be a semicolon delimited list. In another example, rather than using the text "NIC" to represent a network interface card, another alphanumeric string may be used (e.g., "NetworkCard"). In addition, the order of different portions of the text may be changed in other embodiments. For example, the make/model may be indicated first, followed by the configuration, followed by the boot order.

Figure 4:
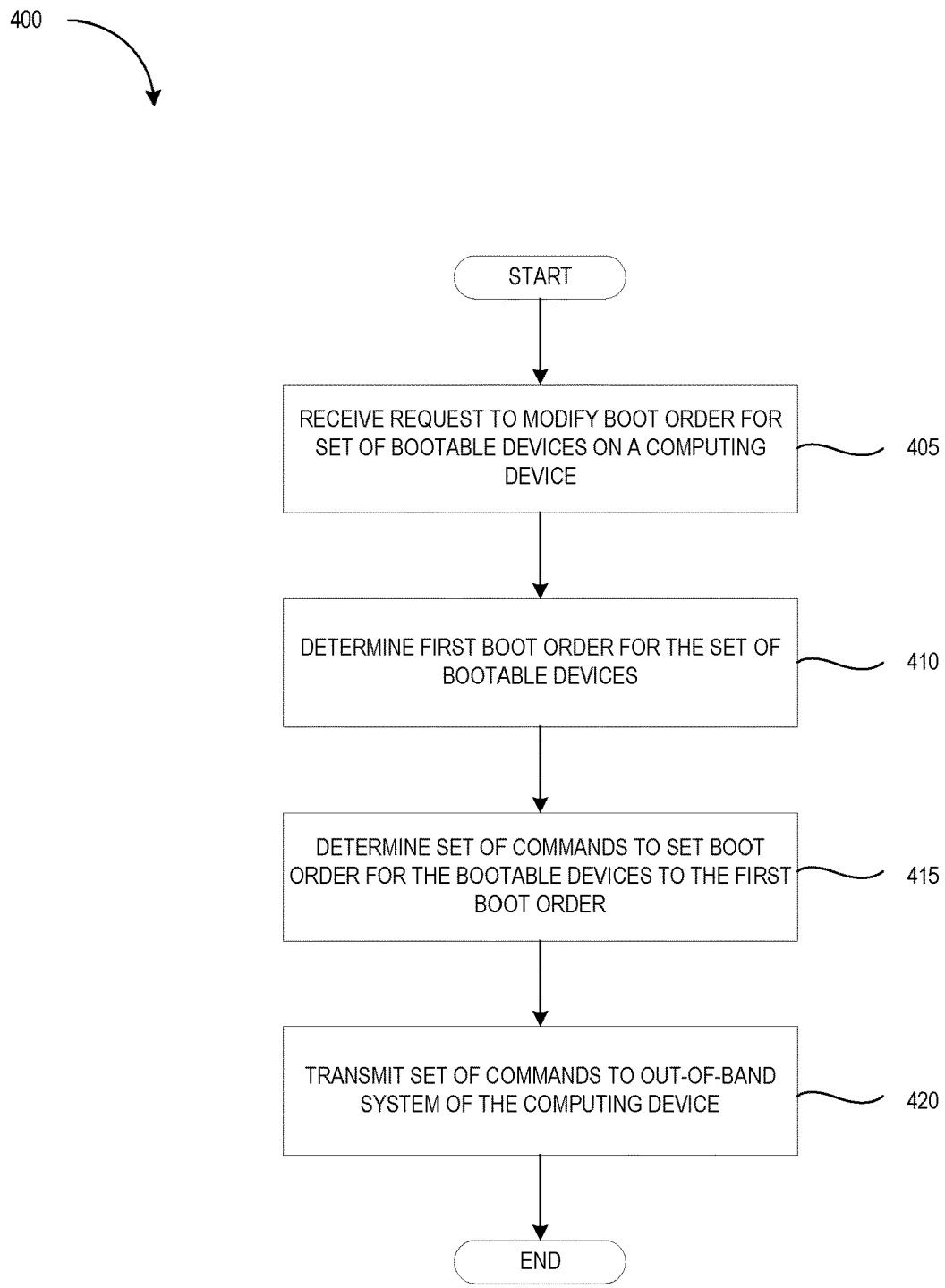
FIG. 4 is a flow diagram of a method for managing boot devices orders for a computing device, in accordance with some embodiments of the present disclosure.

FIG. 4 is a flow diagram of a process 400 of managing boot devices orders for a computing device, in accordance with some embodiments of the present disclosure. Process 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device (e.g., computing device 220 illustrated in FIG. 2) and a device management module (e.g., device management module 225 illustrated in FIG. 2).

With reference to FIG. 4, process 400 illustrates example functions used by various embodiments. Although specific function blocks ("blocks") are disclosed in process 400, such blocks are examples. That is, embodiments are well suited to performing various other blocks or variations of the blocks recited in process 400. It is appreciated that the blocks in process 400 may be performed in an order different than presented, and that not all of the blocks in process 400 may be performed.

Process 400 begins at block 405 where the process 400 receives a request to modify the boot order (e.g., modify the current boot order) for a set of bootable devices on a computing device. For example, a user may provide a request to modify the boot order via a GUI, a command line interface, etc. The request may include an identifier (e.g., a name) for the computing device and a configuration for the computing device. At block 410, the process 400 may determine a first boot order for the set of bootable devices based on one or more of the identifier for the computing device, the configuration, and boot metadata. For example, referring to FIG. 3, the process 400 may use the identifier to determine a make/model for the computing device. The process 400 may identify an entry in the boot metadata 226 based on the make/model and the configuration. The identified entry (e.g., entry 305B) may indicate a boot order for a set of bootable devices of the computing device.

The process 400 may determine a set of commands to set the boot order of the computing device to the first boot order at block 415. For example, the process 400 may access command data to determine a set of commands to set the boot order of the computing device to the first boot order. The command data may include sets of commands (e.g., different libraries, different APIs, etc.) for different makes and/or models of computing devices. The process 400 may determine the appropriate set of commands for a computing devices based on the make/model of the computing device. At block 420, the process 400 may transmit the set of commands to an out-of-band system of the computing devices to set the boot order of the computing device to the first boot order. The out-of-band system may modify the BIOS or UEFI of the computing device to set the boot order to the first boot order.

Figure 5:
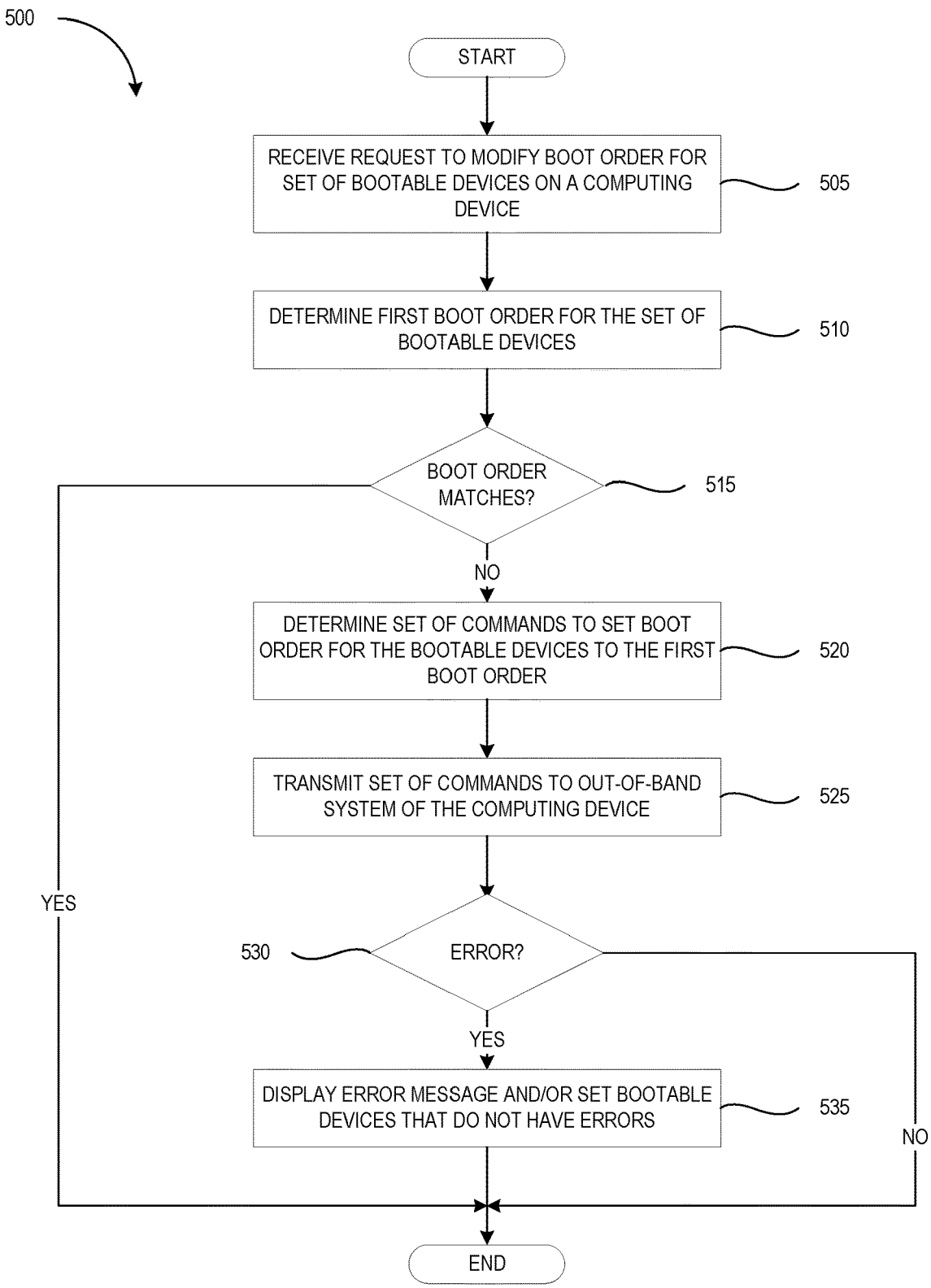
FIG. 5 is a flow diagram of a method for managing boot devices orders for a computing device, in accordance with some embodiments of the present disclosure.

FIG. 5 is a flow diagram of a process 500 of managing boot devices orders for a computing device, in accordance with some embodiments of the present disclosure. Process 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device (e.g., computing device 220 illustrated in FIG. 2) and a device management module (e.g., device management module 225 illustrated in FIG. 2).

With reference to FIG. 5, process 500 illustrates example functions used by various embodiments. Although specific function blocks ("blocks") are disclosed in process 500, such blocks are examples. That is, embodiments are well suited to performing various other blocks or variations of the blocks recited in process 500. It is appreciated that the blocks in process 500 may be performed in an order different than presented, and that not all of the blocks in process 500 may be performed.

Process 500 begins at block 505 where the process 500 receives a request to modify the boot order (e.g., modify the current boot order) for a set of bootable devices on a computing device. For example, a user may provide a request to modify the boot order via a GUI, a command line interface, etc. The request may include an identifier (e.g., a name) for the computing device and a configuration for the computing device. At block 510, the process 500 may determine a first boot order for the set of bootable devices based on one or more of the identifier for the computing device, the configuration, and boot metadata. For example, referring to FIG. 3, the process 500 may use the identifier to determine a make/model for the computing device. The process 500 may identify an entry in the boot metadata 226 based on the make/model and the configuration. The identified entry (e.g., entry 305B) may indicate a boot order for a set of bootable devices of the computing device. At block 515, the process 500 may determine whether the current boot order of the computing device matches the first boot order. If the current boot order matches the first boot order the process 500 may refrain from determining a set of commands and transmitting the set of commands to the computing device (e.g., the process 500 may end).

If the current boot order does not match the first boot, the process 500 may determine a set of commands to set the boot order of the computing device to the first boot order at block 520. For example, the process 500 may access command data to determine a set of commands to set the boot order of the computing device to the first boot order. The command data may include sets of commands (e.g., different libraries, different APIs, etc.) for different makes and/or models of computing devices. The process 500 may determine the appropriate set of commands for a computing devices based on the make/model of the computing device. At block 525, the process 500 may transmit the set of commands to an out-of-band system of the computing devices to set the boot order of the computing device to the first boot order. The out-of-band system may modify the BIOS or UEFI of the computing device to set the boot order to the first boot order.

At bock 530, the process 500 may determine whether there is an error in setting the boot order of the computing device. For example, the process 500 may determine whether and error message was received from the out-of-band system. If there is no error (e.g., not messages indicating an error are received), the process 500 ends. If there is an error, the process 500 may display the error message (e.g., provide the error message to a user) and/or may set the other bootable devices that do not have an error at block 535. For example, the process 500 may receive a message from the out-of-band system indicating that a bootable device indicated in the first boot order does not exist on the computing device. The process 500 may set the boot order to use the other bootable devices indicated in the first boot order, as discussed above. The process 500 may also display an error message to the user via a GUI, a command line interface, etc.

Figure 6:
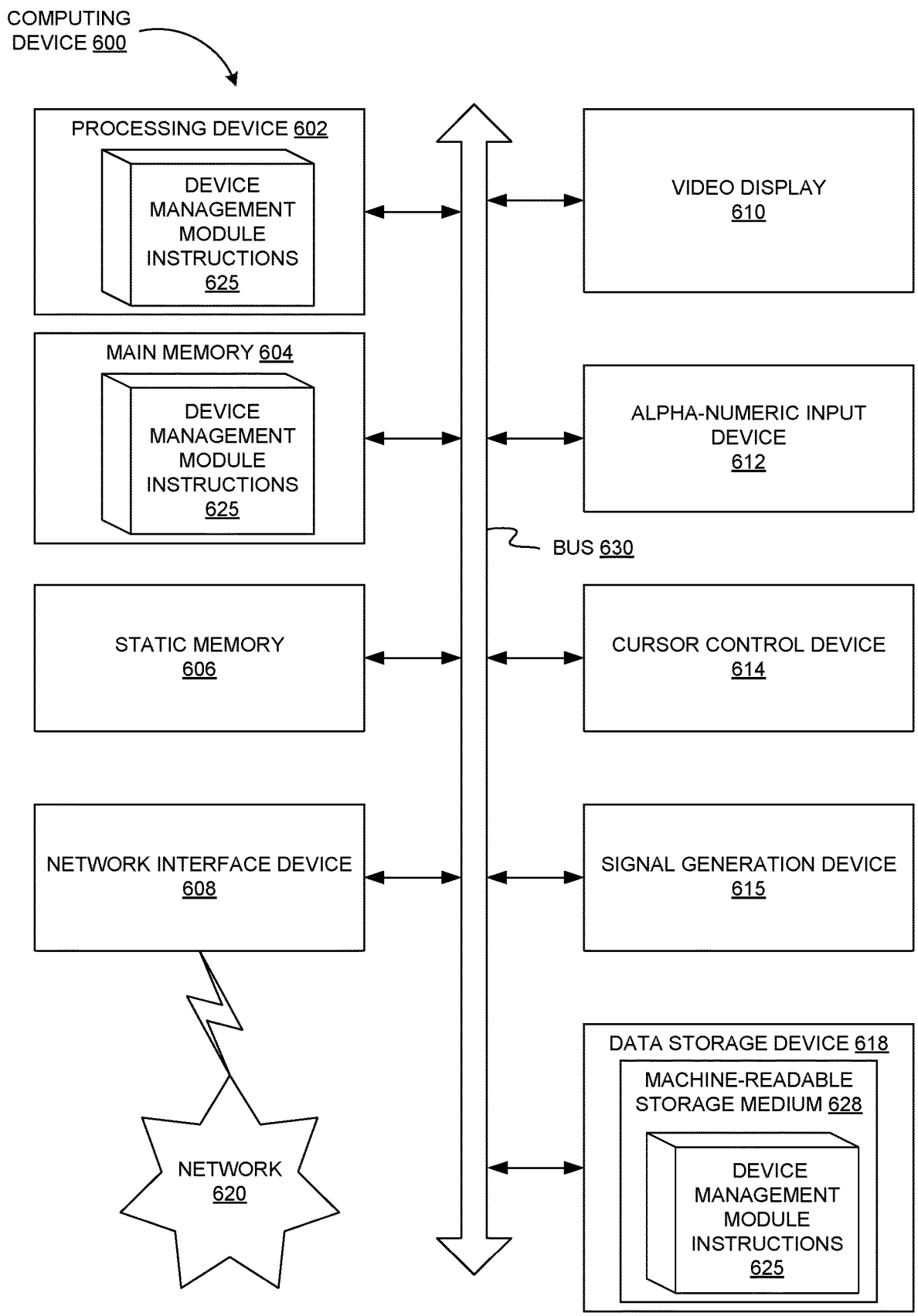
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. For example, computing device 600 may modify a fake virtual driver of a control plane with virtual switch-related functionality and generate a container image including a plurality of processes for providing virtual network functionality. The plurality of processes may include a compute process to create and terminate fake virtual machines using the modified fake virtual driver. The plurality of processes may further include a network service agent to interface with the compute process to simulate a network configuration of fake virtual machines and virtual switch daemons to enable virtual switch functionality and commands within a simulated compute node generated from the container. The computing device 600 may generate a plurality of simulated compute nodes using the container image and generate a plurality of fake virtual machines on a simulated compute node of the plurality of simulated compute nodes using the modified fake virtual driver. The virtual network switch functionality may enable the modified fake driver to interact with the networking service agent and virtual switch daemons to simulate a configuration of each fake virtual machine that is created on the simulated compute node, thereby simulating network traffic on the control plane as well as the interaction between simulated compute nodes and the control plane.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a programmable logic device (PLD), etc.) 602, a main memory 604 (e.g., synchronous dynamic random access memory (DRAM), read-only memory (ROM)), a static memory 606 (e.g., flash memory), and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of device management module instructions 625, e.g., instructions for carrying out the operations described herein, in accordance with one or more aspects of the present disclosure. Device management module instructions 625 may also reside, completely or at least partially, within main memory 604 and/or within processing device 602 during execution thereof by computing device 600, main memory 604 and processing device 602 also constituting computer-readable media. The device management module instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "transmitting," "refraining," "providing," "requesting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

receiving a request to modify a boot order for a set of bootable devices on a computing device, wherein the computing device is one of a set of heterogeneous computing devices, and wherein the request comprises an identifier for the computing device and a configuration for the computing device;

determining a first boot order for the set of bootable devices on the computing device based on the identifier for the computing device, the configuration for the computing device, and a boot metadata, wherein the boot metadata comprises a set of boot orders for the set of heterogeneous computing devices and wherein the boot metadata conforms to a common syntax across the set of heterogeneous computing devices;

determining a set of commands to set the boot order for the set of bootable devices to the first boot order based on command data, wherein the command data indicates a plurality of commands for managing the set of heterogeneous computing devices; and transmitting the set of commands to an out-of-band system of the computing device, wherein the plurality of commands comprises subsets of commands that are compatible with different out-of-band systems.

2. The method of claim 1, wherein:

the boot metadata comprises a set of entries;

each entry comprises a corresponding identifier, a corresponding configuration, and a corresponding boot order; and the corresponding boot order comprises a set device types, a set of device locations, and a set of device identifiers.

3. The method of claim 1, further comprising:

determining whether the boot order of the computing device matches the first boot order; and refraining from transmitting the set of commands when the boot order of the computing device matches the first boot order.

4. The method of claim 1, further comprising:

determining that the first boot order has an error with a subset of the set of bootable devices; and transmitting a second set of commands to the out-of-band system of the computing device to set the boot order without using the subset of the set of bootable devices.

5. The method of claim 1, further comprising:

determining that the first boot order has an error with a subset of the set of bootable devices; and providing an error message to a user, wherein the error message indicates the error with the subset of the set of bootable devices.

6. The method of claim 1, further comprising:

receiving a second request to check the boot order for the set of bootable devices;

requesting the boot order for the set of bootable devices via the out-of-band system of the computing device; and providing the boot order for the set of bootable devices to a user.

7. The method of claim 1, further comprising:

receiving a second request to use a first bootable device of the set of bootable devices to for a one-time boot of the computing device;

determining a second set of commands to configure the computing device to use the first bootable device for the one-time boot of the computing device based on the command data; and transmitting the second set of commands to the out-of-band system of the computing device.

8. The method of claim 1, further comprising:

receiving a second request for list of available bootable devices of the set of heterogeneous computing devices;

requesting the list of available bootable devices from the set of heterogeneous computing devices via a set of out-of-band systems of the set of heterogeneous computing devices; and providing the list of available bootable devices to a user.

9. The method of claim 1, wherein the out-of-band system of the computing device is to set the boot order for the set of bootable devices to the first boot order by updating one or more of a basis input/output system (BIOS) or a unified extensible firmware interface (UEFI) based on the set of commands.

10. The method of claim 1, wherein the set of heterogeneous computing devices comprises one or more of:

computing devices from different vendors; or different models of computing devices from a same vendor.

11. An apparatus, comprising:

a memory; and a processing device operatively coupled to the memory, the processing device to:

receive a request to modify a boot order for a set of bootable devices on a computing device, wherein the computing device is one of a set of heterogeneous computing devices, and wherein the request comprises an identifier for the computing device and a configuration for the computing device;

determine a first boot order for the set of bootable devices on the computing device based on the identifier for the computing device, the configuration for the computing device, and a boot metadata, wherein the boot metadata comprises a set of boot orders for the set of heterogeneous computing devices and wherein the boot metadata conforms to a common syntax across the set of heterogeneous computing devices;

determine a set of commands to set the boot order for the set of bootable devices to the first boot order based on command data, wherein the command data indicates a plurality of commands for managing the set of heterogeneous computing devices;

determine whether the boot order of the computing device matches the first boot order;

transmit the set of commands to an out-of-band system of the computing device when the computing device does not match the first boot order; and refrain from transmitting the set of commands when the boot order of the computing device matches the first boot order.

12. The apparatus of claim 11, wherein:

the boot metadata comprises a set of entries;

each entry comprises a corresponding identifier, a corresponding configuration, and a corresponding boot order; and the corresponding boot order comprises a set device types, a set of device locations, and a set of device identifiers.

13. The apparatus of claim 11, wherein the plurality of commands comprises subsets of commands that are compatible with different out-of-band systems.

14. The apparatus of claim 11, wherein the processing device is further to:
  determine that the first boot order has an error with a subset of the set of bootable devices; and
  transmit a second set of commands to the out-of-band system of the computing device to set the boot order without using the subset of the set of bootable devices.

15. The apparatus of claim 11, wherein the processing device is further to:
  receive a second request to check the boot order for the set of bootable devices;
  request the boot order for the set of bootable devices via the out-of-band system of the computing device; and
  provide the boot order for the set of bootable devices to a user.

16. The apparatus of claim 11, wherein the processing device is further to:
  receive a second request to use a first bootable device of the set of bootable devices for a one-time boot of the computing device;
  determine a second set of commands to configure the computing device to use the first bootable device for the one-time boot of the computing device based on the command data; and
  transmit the second set of commands to the out-of-band system of the computing device.

17. The apparatus of claim 11, further comprising:
  receive a second request for list of available bootable devices of the set of heterogeneous computing devices;
  request the list of available bootable devices from the set of heterogeneous computing devices via a set of out-of-band systems of the set of heterogeneous computing devices; and
  provide the list of available bootable devices to a user.

18. A non-transitory computer readable medium having instruction stored thereon that, when executed by a processing device, cause the processing device to:
  receive a request to modify a boot order for a set of bootable devices on a computing device, wherein the computing device is one of a set of heterogeneous computing devices, and wherein the request comprises an identifier for the computing device and a configuration for the computing device;
  determine a first boot order for the set of bootable devices on the computing device based on the identifier for the computing device, the configuration for the computing device, and a boot metadata, wherein the boot metadata comprises a set of boot orders for the set of heterogeneous computing devices and wherein the boot metadata conforms to a common syntax across the set of heterogeneous computing devices;
  determine a set of commands to set the boot order for the set of bootable devices to the first boot order based on command data, wherein the command data indicates a plurality of commands for managing the set of heterogeneous computing devices; and
  transmit the set of commands to an out-of-band system of the computing device;
  receive a second request to use a first bootable device of the set of bootable devices for a one-time boot of the computing device;
  determine a second set of commands to configure the computing device to use the first bootable device for the one-time boot of the computing device based on the command data; and
  transmit the second set of commands to the out-of-band system of the computing device.

\* \* \* \* \*